June 3, 1952  H. E. LA BOUR  2,599,333
SHAFT CONNECTION
Filed Oct. 9, 1950
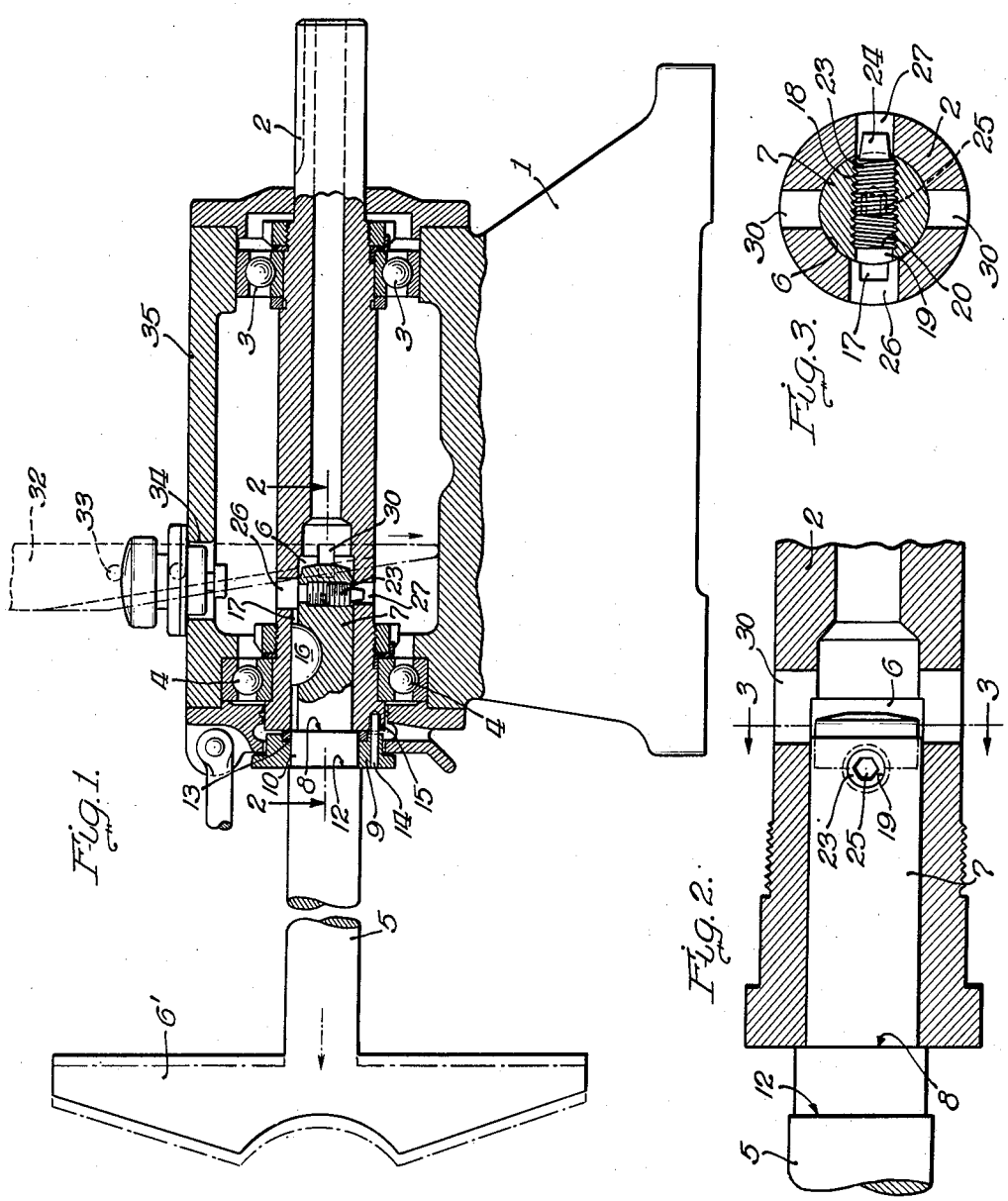
INVENTOR.
Harry E. LaBour
BY
Attys.

Patented June 3, 1952

2,599,333

UNITED STATES PATENT OFFICE 2,599,333

SHAFT CONNECTION

Harry E. La Bour, Elkhart, Ind., assignor to The La Bour Company, Inc., Elkhart, Ind., a corporation of Indiana Application October 9, 1950, Serial No. 189,190

7 Claims. (Cl. 287—119)

1

This invention relates generally to the connection of two shaft sections and in one specific embodiment is concerned with the connection of an impeller shaft section with a driving shaft section in a centrifugal pump. However, it is not intended to limit the invention to that specific use.

In the construction of centrifugal pumps, and particularly pumps designed for resisting the action of corrosive liquids, the impeller may be formed with an integral shaft section long enough to extend out of the pump casing and beyond the sealing means between such shaft section and the pump casing. The impeller shaft section is coupled to a driving shaft section which latter is supported in suitable bearings carried in a housing on a supporting frame or a bearing pedestal.

Such a structure in a horizontal pump is shown in my prior Patent No. 2,134,255, granted October 25, 1938, and in a vertical pump in my prior Patent No. 2,381,824 of August 7, 1945. The impeller shaft section, except for the negligible support which may be gained in the shaft packing, where that is used, is carried as an outboard or cantilever extension of the driving shaft section. As disclosed in said prior patents, the impeller shaft section, which is made of corrosion resisting alloy, has a stud telescoped into a socket in the driving shaft section and keyed thereinto. The two parts are held together endwise by a longitudinal tension bolt extending axially through the driving shaft section.

The connection between the driving shaft section and the impeller shaft section illustrated in said prior patents is quite satisfactory from a mechanical standpoint, but it involves getting at the head of the longitudinal tension bolt to disconnect the impeller shaft section from the driving shaft section. Where direct drive is employed, the motor coupling must be moved out of the way. This may involve movement of the motor itself.

The general arrangement is compact and efficient and it is desirable to retain, so far as possible, all the advantageous features of the present design, but to discover some way of holding the telescoped parts together, after the stud is forced into the socket, which will be wholly reliable in action, but which can be released and again secured with minimum service labor.

According to the present invention, I dispose in a transverse or cross bore in the end of the impeller shaft section stud a pin, preferably screw threaded in the bore, with a tapered outer end bearing against a radially extending shoulder in

2 the socket of the driving shaft section. This tapered end of the pin bearing against the radially extending shoulder is in effect a wedge between the parts to prevent axial motion of the sections relative to each other. The angle of the tapered end is small enough to constitute an irreversible transformer of pressure, that is to say, the tangent of the angle of the wedge is less than the coefficient of friction between the engaging surfaces.

The pin, when driven into wedging position, has its center of gravity on the same side of the axis of the shaft sections as that on which the tapered end of the pin lies. Hence, centrifugal force tends to tighten the wedge in place and vibration is not effective to loosen it.

The supporting pedestal or housing for the driving shaft section bearings has a suitable opening permitting access to said locking pin. Also the socket in the driving shaft has a suitable provision by way of a transverse opening therethrough for the entry of a drift or wedge to start the stud out of the socket. The opening in the housing admits the drift or wedge for this purpose.

Now in order to acquaint those skilled in the art with the manner of constructing and operating a device embodying my invention, I shall describe, in connection with the accompanying drawings, a specific embodiment of the same.

In the drawings:

Figure 1 is a side elevation, partly in section, of a connection between an impeller shaft section and a driving shaft section embodying my invention;

Figure 2 is a fragmentary horizontal section taken on the line 2—2 of Figure 1; and Figure 3 is a transverse, vertical section, taken on the line 3—3 of Figure 2.

The pedestal 1 has a housing 35 which carries the driving shaft section 2 in ball bearings 3 and 4. This driving shaft section 2 may be made of plain carbon steel offering no substantial resistance to the action of corrosive fluids. The driving shaft section 2 supports and carries as an outboard or cantilever extension the impeller shaft 5 which carries the impeller 6' at the left hand end, as viewed in Figure 1. In this embodiment, the impeller 6' and the shaft 5 are a single casting of corrosion resistance metal. Obviously, these two parts 5 and 6' may be separate pieces connected mechanically. The impeller 6' is housed in a suitable impeller casing which is not shown since the same forms no part of the present invention. The driving shaft section 2 has at the left hand end a central axial socket 6, and the impeller shaft section 5 has a cooperating stud 7 telescoping in the said socket 6 with a close fit which must, however, be such as to permit removal of the stud from the socket for servicing the pump, as may be necessary when the impeller becomes worn out, or requires to be renewed.

The impeller shaft 5 has a shoulder 8 which engages the end of the driving shaft at the socket 6 to limit the inward motion of the stud 7 into the socket. A slinger ring 9 has a press fit upon a cylindrical step portion 10 of the shaft 5, and this ring 9 is pressed up against the shoulder 12 on the said shaft 5. A packing 13 in the form of an annular ring is disposed in an annular groove at the right hand end of the ring 9, and this packing 13 bears against the adjacent end wall of the shaft section 2 to form a seal which is intended to exclude the creepage of corrosive liquid along the surface of the shaft, and thereby to keep it out of the socket 6 and out of the bearings.

The slinger ring 9 is pressed upon the surface 10, and it is located in definite angular position by a pin 14 carried by the ring and entering loosely into a locating socket 15 formed in the end of the driving shaft section 2.

The stud 7 carries a Woodruff key 16 which enters a keyway 17 formed on the inside of the socket 6. This key and keyway tie the two shaft sections together for rotary motion as a unit.

The stud member 7 has near its inner end a transverse opening, see Figure 3, consisting of a portion 18 of larger diameter for the main body of the opening and a portion 19 of smaller diameter, providing between them a shoulder 20. In the part of the bore of larger diameter 18, a pin 23 is seated. This pin is screw-threaded in the present embodiment, and engages threads in the said larger bore 18. The threads extend to the shoulder 20 and the pin 23 is of a length such that it may be disposed wholly inside of the said larger bore 18. The pin 23 has a tapered outer end 24 which is conical in shape, and is not screw threaded. At the opposite end, the pin has a polygonal socket 25 into which the end of a polygonal wrench may be disposed for turning the pin on its threads in the bore 18.

The driving shaft section 2 has a pair of diametrically registering openings 26 and 27, the said opening 26 being disposed in line with the bore 19 of the stud, so that a wrench may be introduced through the opening 26 to the polygonal socket 25 of the pin 23, and the said locking pin turned on its threads. The opening 26 is preferably of a size such that the edges thereof could not be engaged by the tapered end 24 of the said pin 23. The opening 27, however, is small enough for its edges to be engageable by the flank surface of the tapered end 24 of the pin 23, and preferably the axis of the opening 27 either coincides with the axis of the screw 23 or it falls a little to the right of the axis of the screw 23 as viewed in Figure 1, so that driving the screw on the threads to force the tapered end into the opening will cause a wedging engagement between the flank of the conical extension of the screw and the edges of the opening 27, which edges provide a shoulder against which the tapered end acts so that the stud tends to be pulled farther in the direction of entering the socket.

It is not intended that the screw shall perform the function of moving the stud into the socket although it might be designed to do so to a slight extent. It is intended primarily to lock the stud and socket together against endwise separation after they have been forced into telescopic relation to each other to the extent desired. To ensure this capability it is preferable to offset the bore 18 with respect to the opening 27 so that the tapered end of the screw pin 23 will wedge against the left side wall of opening 27 as viewed in Figure 1, tending to pull the stud into the socket.

The driving shaft section 2 further has a pair of transverse openings 30—30 diametrically in line with each other adjacent the end of the stud 7. These openings 30—30 are preferably disposed with their axis at 90° to the axis of the openings 26—27 and are adapted to receive a flat drift pin which serves as a wedge for starting the stud out of the socket when the locking pin 23 has been withdrawn into the stud 7. The drive member 32 has a cross pin 33 so arranged with respect to the opening 34 in the bearing house 35 that when the said drift member has been driven down as far as its taper is useful in starting the stud out of the socket, the stop pins 33 will engage the sides of the opening 34 in the bearing barrel 35 so as to prevent unnecessary pounding of the shaft section 2 in its bearings.

The operation of the device is as follows:

The shaft section 2 being in place in its bearings, the impeller shaft section 5 is introduced through the opening in the impeller casing (not shown); the pin on the slinger ring 9 is lined up with the recess 15; the Woodruff key 16 is put in place in the stud; and the key lined up with the keyway 17; the locking pin 23 is withdrawn wholly inside the portion 18 of the transverse bore in the said stud; and the said stud is then forced into the socket 6. The Woodruff key 16 entering the keyway 17, lines up the locking pin 23 with the opening 27. The operator then inserts a driving wrench through the opening 34 in the bearing barrel 35 into the socket in the pin and drives the pin into the opening 27. Obviously, in the case of a plain sliding fit between the pin and its supporting bore, the driving of the pin 23 into the opening 27 could be accomplished by a punch driven against the rear of the pin. The pin 23 is not designed to take the driving torque between the shaft sections.

Since the shaft section 2 is subject to lubrication at all times, preferably with grease, the inside of the socket 6 and the engaging surfaces are coated with a film of lubricant and even if there should be a slight amount of play, such as occurs from eccentricity or an eccentric load upon the impeller shaft, galling of the engaging surfaces will not occur, or at least will not be a serious factor.

When the parts are to be separated, the cover of the opening 34 is removed, and the shaft is turned until the opening 26 is in line with the opening 34 in the housing.

The next step is to release the locking pin 23 from its locking position, and this may be done by entering a wrench into the hexagonal socket 25 in the threaded pin 23, and to back the same off until the screw engages the shoulder 20. When the screw is in this position, the tapered end is withdrawn wholly within the peripheral confines of the shaft itself. The parts having been unlocked, the stud may then be forced out of the socket, and to start to disengage the stud from the socket, the said drift tool 32 is employed. The shaft 2 is then turned until one of the openings 30—30 is in line with the opening 34, whereupon the drift tool 32 is inserted in the opening 30, and the drift is driven between the end walls of the opening 30 and the end of the stud 7. The broken line outline of the drift 32 and the broken line outline of the impeller 6' show the extent of movement of these parts.

When the drift has been driven as far as it is effective, the pins 33 will engage the top of the barrel 35 and prevent further driving of the drift putting a load upon the bearings. Also, the indication to the operator will be that the drift has moved to its extreme position, and the impeller and its shaft may then be pulled by other means, such as by inserting pry bars under the blades of the impeller 6' to pull the shaft out of the socket.

The slinger ring 9 is then forced off of the cylindrical portion 10, and a new impeller and impeller shaft section may be inserted in place. To do so, the slinger ring 9 is passed over the stud 7, the Woodruff key 16 is put in place, the impeller shaft section 5 is lined up with the Woodruff key in line with the keyway 17, and the pin 14 on the slinger ring 9 is lined up with the socket 15 in the end of the shaft section 2. Then the impeller shaft 5 is pressed into the slinger ring and into the socket until the pin 23 registers with the openings 26 and 27. Thereupon the pin is run out of the bore to cause it to bring the flank of the tapered end 24 into engagement with the edges of the openings 27 to lock the stud and socket together.

Obviously, the details of the above described construction may be varied within the limits of the appended claims.

I claim:

1. Shaft coupling comprising a shaft section having an axial socket, a shaft section having an axial stud telescoped into said socket, there being a radially extending opening through a wall of the socket remote from the outer end of the socket, and a radially extending shoulder in the wall of the socket diametrically opposite said opening, the stud having a transverse opening therethrough in substantial alignment with said opening in the socket, a lock screw threaded in said transverse opening in the stud, said screw having a tapered end adapted to engage said radially extending shoulder on the socket tending to lock the stud with respect to the socket, the center of gravity of said screw lying on the same side of the axis of the stud as the tapered end of the screw.

2. The coupling of claim 1 wherein there is a stop shoulder at one end of the transverse opening for stopping movement of the screw away from the shoulder in the socket.

3. The coupling of claim 1 wherein the socket has an internal keyway and the shaft has a key entering said keyway, said shaft having a radial shoulder for engaging the end of the socket, said radial shoulder on the shaft covering said keyway.

4. Shaft coupling comprising a driving shaft section having an axial socket, an impeller shaft section having a radial shoulder adapted to engage the end of the socket and a stud adapted to telescope in the socket, a pair of diametrically disposed openings in the walls of the socket, a cross bore in the stud, a pin with a tapered end adapted to be projected from the stud and to engage one side of one of said diametrical openings to draw the shaft shoulder against the end of the socket, said cross bore having its outer end constricted to prevent escape of the pin from that end of the bore.

5. Coupling of shaft sections comprising a first shaft section having a central axial socket, a second shaft section having a central axial stud fitting into said socket, there being mating keyways in the socket and stud, a key in said ways, said stud and said socket having diametrically disposed cross bores in the same diametrical plane, but with the axis of the cross bore in the stud nearer to the outer end of the socket than is the axis of the cross bore of the socket, a locking pin screw threaded in the cross bore of the stud, said pin having a tapered outer end which is forced into the adjacent opening of the cross bore of the socket and serving to lock the stud in the socket, and a transverse opening through the socket adjacent the end of the stud for the insertion of a tapered drift wedge in order to force the stud endwise outwardly of the socket.

6. Drive for a pump impeller comprising a drive shaft, an impeller shaft in axial alignment, an axial socket in one end of the drive shaft, a stud on the adjacent end of the impeller shaft telescoped into the socket, bearings for the drive shaft, one of said bearings being adjacent the socketed end of the drive shaft, the impeller shaft having a shoulder for engaging the end of the socket, there being registering keyways in the stud and socket, a key in said ways, the keyway in the socket being closed by said shoulder, a threaded transverse locking pin carried in the shaft and having a tapered end, there being a shoulder in the socket engaged by said tapered end for holding the impeller shaft shoulder against the end of the drive shaft.

7. The combination of claim 5 with a bearing housing containing spaced drive shaft bearings and enclosing the drive shaft section intermediate said bearings, said housing having an opening in line with said pin to permit release of the same and for entry of said drift wedge, said drift wedge having a lateral shoulder adapted to engage said housing to limit the inward motion of said drift wedge.

HARRY E. LA BOUR.

REFERENCES CITED

The following references are of record in the file of this patent:

UNITED STATES PATENTS

| Number | Name | Date |
|---|---|---|
| 670,470 | Cox | Mar. 26, 1901 |
| 1,661,226 | Martin | Mar. 6, 1928 |
| 1,912,201 | Huck | May 30, 1933 |
| 2,134,475 | Green | Oct. 25, 1938 |